United States Patent
Zahlhaas

(10) Patent No.: US 11,378,203 B2
(45) Date of Patent: Jul. 5, 2022

(54) METHOD FOR DETERMINING THE DEGREE OF WEAR OF A VALVE, AND APPARATUS FOR CARRYING OUT SAID METHOD

(71) Applicant: Werner Zahlhaas, Germering (DE)

(72) Inventor: Werner Zahlhaas, Germering (DE)

(*) Notice: Subject to any disclaimer, the term of this patent is extended or adjusted under 35 U.S.C. 154(b) by 77 days.

(21) Appl. No.: 16/288,498

(22) Filed: Feb. 28, 2019

(65) Prior Publication Data

US 2019/0195390 A1 Jun. 27, 2019

Related U.S. Application Data

(62) Division of application No. 15/507,294, filed on Feb. 28, 2017, now Pat. No. 11,079,040.

(30) Foreign Application Priority Data

Sep. 1, 2014 (DE) ..................... 10 2014 012 688.9

(51) Int. Cl.
*F16K 37/00* (2006.01)
*F16K 31/00* (2006.01)

(52) U.S. Cl.
CPC ........ *F16K 37/0083* (2013.01); *F16K 31/002* (2013.01); *F16K 37/0075* (2013.01)

(58) Field of Classification Search
CPC .................................................. F16K 37/0083
See application file for complete search history.

(56) References Cited

U.S. PATENT DOCUMENTS

2003/0125841 A1  7/2003  Schlosser
2008/0264498 A1* 10/2008  Thompson .......... F16K 37/0083
                                                    137/554

FOREIGN PATENT DOCUMENTS

DE  10 2011 077 901 A1  12/2012
WO     2013/099386 A1   7/2013

OTHER PUBLICATIONS

English machine translation for DE 10 2011 077 901 (Year: 2012).*
International Search Report of PCT/EP2015/025063, dated Feb. 5, 2016. [PCT/ISA/210].

* cited by examiner

*Primary Examiner* — John E Breene
*Assistant Examiner* — Jeffrey C Morgan
(74) *Attorney, Agent, or Firm* — Sughrue Mion, PLLC

(57) ABSTRACT

A method for determining the degree of wear of a valve, the degree of wear of the valve being dependent on the degree of wear of an operating element that is made of an expandable material and performs a mechanical movement each time the temperature changes, the change in temperature resulting in wear, the operating element made of an expandable material being mechanically connected to a piston; the movements of the operating element (3) made of an expandable material are calculated by initially sensing the change in temperature on the operating element (3), whereupon the changes in temperature are recalculated as movements on the basis of the temperature/expansion curve applicable to the operating element (3) made of an expandable material.

8 Claims, 1 Drawing Sheet

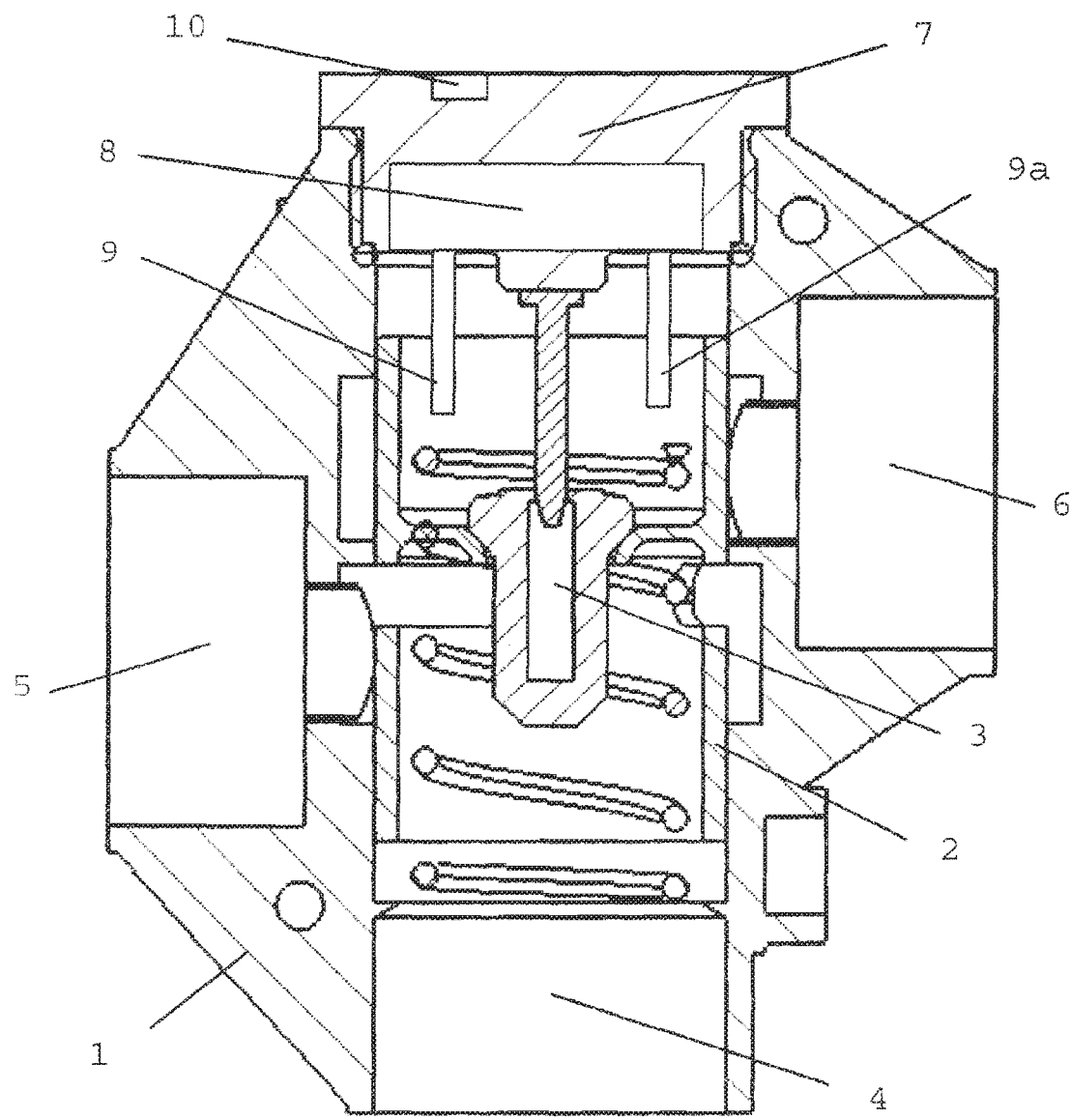

METHOD FOR DETERMINING THE DEGREE OF WEAR OF A VALVE, AND APPARATUS FOR CARRYING OUT SAID METHOD

CROSS REFERENCE TO RELATED APPLICATIONS

This application is a Divisional of U.S. patent application Ser. No. 15/507,294, filed Feb. 28, 2017, which is a National Stage of International Application No. PCT/EP2015/025063, filed Sep. 1, 2015, which claims priority from German Patent Application No. 10 2014 012 688.9, filed Sep. 1, 2014, the contents of all of which are incorporated herein by reference in their entirety.

The invention relates to the determination of a prospective or already actually occurred degree of wear of a valve, for example a multi-way valve.

Located inside a multi-way valve is a piston, which can occupy different positions. The ratio as to how the medium flows through the multi-way valve changes depending on the position of the piston. The position of the piston is changed in a temperature-dependent manner by a so-called expandable material operating element which is connected mechanically to the piston.

The expandable material operating element expands corresponding to a temperature/movement curve with an increase in temperature and contracts again when the temperature drops.

These temperature-dependent movements lead to wear. Inside the multi-way valve, the expandable material operating element is the element upon the degree of wear whereof the function of the valve is particularly dependent.

Manufacturers of multi-way valves of the known type have values acquired empirically from past experience for the operating conditions of a multi-way valve and deduce therefrom how long an expandable material operating element can remain in use in a multi-way valve until the wear limit of the expandable material operating element has probably been reached.

On the basis of the period in use of a multi-way valve in a cooling circuit, it is assumed that, after a certain period in use, the wear of the expandable material operating element has, with a certain degree of probability, advanced so far that it is advisable, for the purpose of continued operational reliability of the multi-way valve and of the system in which the multi-way valve is present, to replace that component in the multi-way valve in which the expandable material operating element is contained. There are also multi-way valves, wherein the expandable material operating element can alone be replaced.

The known multi-way valves have a removable cover. The replacement of the wearing parts can take place in a relatively simple and rapid manner when the cover is removed.

Multi-way valves with an expandable material operating element are used in cooling circuits. A plurality of such multi-way valves are often present in complex cooling circuits.

The actual wear of the individual expandable material operating elements in the individual multi-way valves of a cooling circuit is in practice often different from the theoretical values for a trouble-free period in use that are indicated by the manufacturers. During maintenance work on the cooling circuits, it is difficult to ascertain what the individual actual wear of the individual expandable material operating element in the given multi-way valve is at the present time. Both below-average and above-average wear is possible.

In the case of complex cooling circuits, the maintenance schedules often assume, for safety reasons, an above-average wear and make provision for the early replacement of all wearing parts in all the multi-way valves. The drawback with this is that wearing parts are also replaced in such multi-way valves in the case of which the wearing parts have not yet actually reached the wear limit.

However, the case may disadvantageously arise where the actual individual operating conditions of a multi-way valve can lead to wear of the expandable material operating element that is well above average or the expandable material operating element fails on account of a defect independent of wear, as a result of which the multi-way valve in turn fails before the time for the replacement provided according to schedule has arrived. Unexpected disruptions and/or damage in the system in which the multi-way valve is incorporated can thus detrimentally arise.

The expandable material operating element is a wearing part inside the valve, the actual degree of wear whereof cannot hitherto be ascertained during the ongoing operation. The valve has to be opened and the expandable material operating element removed for a diagnosis of the actual degree of wear. The opening of the valve and the removal and checking of the expandable material operating element are time-consuming and labour-intensive work despite the removable cover. The function of the valve is no longer available during this work, so that this work cannot take place in a running system, which in turn gives rise to costs on account of the shutdown of the system.

DE20120609U1 is known from the prior art. This document describes a diagnostic device for a fluid-technical device, for example a valve device. One or more sensors, which are assigned to the valve and deliver values, are disclosed there. On the basis of these values, the presumed degree of wear on the valve is calculated with the aid of empirically determined comparative values. The calculation of the presumed degree of wear of the known fluid-technical device takes place for example by counting work cycles of the fluid-technical device. The counting of the work cycles alone does not permit a sufficiently reliable conclusion to be drawn as to the wear on the valve, it therefore being proposed to acquire further wear-relevant parameters. With the aid of all the acquired parameters, a conclusion as accurate as possible regarding the wear is intended to be drawn on a statistically empirical basis.

The prior art does not disclose any teaching for determining the actual degree of wear of a valve. The reference to an expandable material operating element and to the typical problems with an expandable material operating element are also wholly absent in the prior art. A reference to taking account of a temperature/movement curve as a parameter in the calculation of the degree of wear is not contained in the prior art.

It is the problem of the invention to provide a method and apparatus for carrying out the method, as a result of which it is possible to determine the actual wear of an expandable material operating element while it is located in a multi-way valve and without the multi-way valve having to be opened or dismantled.

This problem is solved by the features of the claimed invention.

The invention hereby adopts the knowledge that each movement of the expandable material operating element is caused by a change in the temperature of the expandable material operating element. As a result of thermal conduction, a change in temperature of the fluid or medium flowing through the valve also causes a change in temperature of the expandable material operating element. The conclusion drawn from this is that each change in temperature of the fluid or medium also causes a movement of the expandable material operating element.

During operation of the multi-way valve, a continuously updated value for a covered distance results from the permanent adding-up of the absolute value of all the movements. The manufacturer of the expandable material operating element can indicate relatively accurately the covered distance up to the wear limit being reached.

As described above, each change in temperature of the fluid or medium—irrespective of whether the temperature rises or again falls—causes a movement of the expandable material operating element by a certain distance.

According to the invention, the permanent changes in temperature of the expandable material operating element and the temperature/movement curve applicable to the expandable material operating element are used as a data base for determining the precise covered distance.

The temperature/movement curve applicable to the expandable material operating element can exhibit hysteresis and, according to the invention, the course of the hysteresis can also be taken into account, whether the change in temperature is taking place in the rising or falling direction, in order to determine the covered distance.

Together with the manufacturer's specification of the total covered distance being guaranteed, a comparison of the currently determined covered distance with the guaranteed total covered distance enables a conclusion to be drawn as to how far the expandable material operating element is from the wear limit.

This advantageously permits a conclusion to be drawn concerning the wear that is based on current measured values and calculations. The method according to the invention has the advantage over the known method, in which the conclusions concerning wear are based on the time in use and empirically determined values.

A further advantage of the invention is that of individually measuring the time that has passed until a specific covered distance has been reached. This permits a predictive conclusion as to how quickly the wear limit will be reached.

When this covered distance has exceeded a specific threshold value, a signal can be generated which can then be used for planning maintenance work.

Depending on the application and/or the place of use of the multi-way valve, the threshold value from reaching of which a signal is generated for the planning of maintenance work can be determined individually. For example, if a multi-way valve is located at a point of use and a certain amount of time is required to reach this point of use, the threshold value can be set correspondingly lower.

A further element of the invention is to indicate the presumed degree of wear not on the basis of the sum of all the movements detected quantitatively over a period of time, but rather on the basis of a current measurement which immediately provides information as to how the expandable material operating element is behaving at present.

There is an applicable temperature/movement curve in respect of the expandable material operating element, said temperature/movement curve being able to be obtained from a data sheet or, according to the invention, ascertained by measuring device 8 itself.

It can be verified by a correlation of the measured temperature value and the simultaneously measured position of piston 2 whether the expandable material operating element 3 is still expanding and contracting such as it corresponds to the temperature/movement curve applicable to the expandable material operating element.

A deviation of the measured position of the piston from the position which would result from the temperature/movement curve is also an indication of wear. In the case of creeping wear, the deviation increases in the course of time.

Wear that has actually occurred can thus advantageously be detected. A threshold value can also be defined as to what deviation can still be tolerated.

In the case of a deviation above the tolerated value, a signal can be generated and/or maintenance work initiated.

According to the invention, the determination of the temperature/movement curve applicable to the expandable material operating element can take place for each multi-way valve by means of the inventive sensors and/or evaluation electronics themselves. This leads to still more accurate results than when a general curve, e.g. from the manufacturer's data sheet, is used, since scatter can be compensated for.

When the individual curve is created in the case of a new multi-way valve or after the replacement of the expandable material operating element, a correlation between the temperature of the expandable material operating element and the position of the piston is recorded and stored for future calculations. A position is stored in respect of each discrete temperature value. A plurality of data pairs are preferably recorded and stored over the entire temperature range to be expected.

In order to take account of hysteresis effects, provision is made according to the invention to record these data pairs when the change in temperature between two data pairs has a rising tendency and again to record data pairs when the change in temperature has a falling tendency.

In order to assess the deviation of the actual piston position from the applicable temperature/movement curve, account is therefore also taken of whether the change in temperature has a rising or falling tendency.

A possible example of embodiment of the invention is explained in greater detail below with the aid of a FIGURE.

FIG. 1 shows multi-way valve 1 according to the invention in a cross-sectional schematic representation.

A piston 2 is arranged in multi-way valve 1, said piston being able to be moved axially by means of an expandable material operating element 3.

Multi-way valve 1 has an inlet opening 4 into which a medium can flow. Depending on the position of piston 2, the medium can flow out through one of two outlet openings 5 or 6. There are also positions of piston 2 at which the medium can flow out in part from outlet opening 5 and in part from outlet opening 6.

The expandable material operating element 3 is a wearing part and multi-way valve 1 therefore has a cover 7 by means of which the expandable material operating element 3 can be replaced. Cover 7 can be removed in a non-destructive manner.

According to the invention, a measuring device 8 with sensors 9, 9*a*, an indicator 10 and optionally also evaluation electronics and optionally an energy source are housed in this cover 7.

The housing of measuring device 8, position sensor 9, the temperature sensor and optionally further components in cover 7 has the advantage that an existing multi-way valve, in which the existing cover is removed for the routine replacement of the expandable material operating element, can be quickly and easily retrofitted with the invention. For the purpose of retrofitting, a new cover 7 according to the invention is fitted in place of the old cover.

Cover 7, at its outer side, optionally has an optical indicator 10, which displays the current degree of wear of the expandable material operating element 3. It is also possible to house an acoustic indicator 10 in cover 7. Indicator 10 can emit a signal when the wear limit of the expandable material operating element 3 or a threshold value still lying before the actual wear limit is exceeded. Indicator 10 is particularly advantageous in complex cooling circuits, since it can quickly be detected optically or acoustically during maintenance work whether a multi-way valve, and if so which one, requires maintenance. It is also possible for measuring device 8 to emit a signal in the event of a deviation.

Measuring device 8 can comprise, apart from position sensor 9 and the temperature sensor, further sensors, for example a second position sensor 9a or a pressure sensor.

Position sensor 9 can detect the given axial position of piston 2. As sensor principles, both contactless sensor principles are possible, for example inductive or capacitive, magnetic position measurement, optical position measurement or ultrasound position measurement. It is also possible for the position of piston 2 to be provided by mechanical coupling with a potentiometer or a variable capacitor.

In addition to the axial position determination of piston 2, it is also possible with the two position sensors 9 and 9a to detect a lateral play in piston 2. Such a lateral play in piston 2 leads, in both sensors 9 and 9a, to a quantitatively equal change in the measured value, but one that differs in respect of the sign. A lateral play in piston 2 joint with the expandable material operating element 3 is a further indication of the fact that the expandable material operating element 3 is exhibiting wear.

The temperature sensor measures the current temperature of the medium in multi-way valve 1. The temperature of the expandable material operating element 3 follows this change in temperature of the medium with a certain time-lag, which in turn leads to a movement of the expandable material operating element 3. The expandable material operating element 3 expands with a rise in temperature, whilst said expandable material operating element 3 contracts with a fall in temperature. Piston 2 connected mechanically to the expandable material operating element 3 changes its position corresponding to the change in temperature.

On the basis of a temperature/movement curve applicable to the expandable material operating element 3, the expansion and contraction of the expandable material operating element 3 can be determined solely from the permanent changes in temperature of the medium. The degree of wear of the expandable material operating element 3 can be calculated from the sum of all the expansion and contraction movements.

The temperature/movement curve applicable to the expandable material operating element 3 can be obtained from a data sheet or can be determined according to the invention by means of measuring device 8 itself. In this regard, in the case of a new valve or after the replacement of the expandable material operating element, a correlation between the temperature of the expandable material operating element and the position of piston 2 is recorded and stored for future calculations. A position is stored in respect of each discrete temperature value. A plurality of data pairs over the entire temperature range to be expected are preferably recorded and stored.

In order to take account of hysteresis effects, provision is made according to the invention to record these data pairs when the change in temperature between two data pairs has a rising tendency and again to record data pairs when the change in temperature has a falling tendency.

It can be verified by a correlation of a measured temperature value and the simultaneously measured position of piston 2 whether the expandable material operating element 3 is still expanding and contracting such as it corresponds to the temperature/movement curve applicable to the expandable material operating element.

A deviation from the temperature/movement curve is also an indication of wear. Wear can thus advantageously be detected that has actually already occurred and, what is more, before the quantitative sum of all the changes has exceeded the empirically determined value from which the signal is generated that is normally used for the planning of maintenance work.

Multi-way valve 1 or individual parts of multi-way valve 1 can also be made of a non-metallic material, for example plastic or ceramic. If, for example, piston 2 is made of a non-metallic material, a measurement method is then used which can detect the movement of a non-metallic material, for example by means of a capacitive measurement method.

In the case of a multi-way valve 1 the housing of which is made of a non-metallic material, the measuring device can be fitted externally on multi-way valve 1 and does not need to be housed in cover 7. This has the advantage that the measuring device can be retrofitted during the ongoing operation of the multi-way valve.

In the case of a multi-way valve made of a non-metallic material, it is also possible to detect by means of a suitable measuring device whether metal particles are present in the fluid or medium.

The invention claimed is:

1. A method for determining the degree of wear of a valve including an expandable material operating element that is present inside the valve, and a piston connected mechanically to the expandable material operating element, mechanical movements of the expandable material operating element leading to wear in the expandable material operating element, the method comprising:
   detecting changes in temperature of the expandable material operating element,
   converting the changes in temperature into movements by a certain distance of the expandable material operating element on the basis of a predetermined temperature/movement curve,
   determining a continuously updated value for a covered distance of the movements by continuously adding-up the absolute value of the distance of all the movements,
   calculating a degree of wear of the expandable material operating element from the value for the covered distance of the movements.

2. The method according to claim 1, further comprising:
   generating a signal when a value for the covered distance of the movements caused by changes in temperature is exceeded, the signal can be used for planning of maintenance work.

3. The method according to claim 1, further comprising:
   measuring a temperature of the medium flowing into the valve with a temperature sensor.

4. An apparatus for determining the degree of wear of a valve, comprising: an expandable material operating element present inside the valve,
   a piston moveable by the expandable material operating element,
   one or more sensors arranged inside or outside the valve, and evaluation electronics;

wherein the sensors deliver values to the evaluation electronics;

wherein the evaluation electronics are configured to carry out the method according to claim 1.

5. The apparatus according to claim 4, wherein one of the one or more sensors is a temperature sensor, by means of which the changes in temperature of the expandable material operating element or the change in temperature of the fluid flowing through the valve can be detected.

6. The apparatus according to claim 5, wherein the fluid surrounds the expandable material operating element.

7. The apparatus according to claim 4, wherein the evaluation electronics are connected to an optical or acoustic indicator.

8. The apparatus according to claim 4, wherein the evaluation electronics comprises a signal output for information regarding the degree of wear of the expandable material operating element.

\* \* \* \* \*